United States Patent
Zeng et al.

(10) Patent No.: US 12,046,833 B2
(45) Date of Patent: Jul. 23, 2024

(54) BEAM DIRECTION ADJUSTMENT METHOD, APPARATUS, AND ANTENNA SYSTEM

(71) Applicant: HUAWEI TECHNOLOGIES CO., LTD., Guangdong (CN)

(72) Inventors: Ling Zeng, Shenzhen (CN); Ning Yang, Chengdu (CN); Mingde Du, Chengdu (CN); Ke Sun, Chengdu (CN); Meng Cai, Chengdu (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 143 days.

(21) Appl. No.: 17/746,704

(22) Filed: May 17, 2022

(65) Prior Publication Data

US 2022/0278451 A1    Sep. 1, 2022

Related U.S. Application Data (63) Continuation of application No. PCT/CN2020/125747, filed on Nov. 2, 2020.

(30) Foreign Application Priority Data

Nov. 18, 2019    (CN) .......................... 201911129358.3

(51) Int. Cl.
 *H01Q 3/46*    (2006.01)
 *H01Q 1/42*    (2006.01)
 *H01Q 15/02*   (2006.01)

(52) U.S. Cl.
 CPC ................. *H01Q 3/46* (2013.01); *H01Q 1/42* (2013.01); *H01Q 15/02* (2013.01)

(58) Field of Classification Search
 None
 See application file for complete search history.

(56) References Cited

U.S. PATENT DOCUMENTS 6,335,699 B1    1/2002  Honma
9,450,310 B2    9/2016  Bily et al.
(Continued)

FOREIGN PATENT DOCUMENTS

CN    101378147 A    3/2009
CN    102544740 A    7/2012
(Continued)

OTHER PUBLICATIONS

Extended European Search Report in European Appln No. 20890178.5, dated Nov. 28, 2022, 7 pages.
(Continued)

*Primary Examiner* — Wilson Lee
(74) *Attorney, Agent, or Firm* — Fish & Richardson P.C.

(57) ABSTRACT

This application discloses example beam direction adjustment methods, apparatuses, and media. One example method includes obtaining at least one of an azimuth or a pitch angle of a microwave antenna in an antenna system, where the antenna system includes the microwave antenna and a radome installed at an air interface of the microwave antenna, the radome includes a liquid crystal array including M×N liquid crystal cells, and both M and N are integers greater than 0. A target scanning angle of the microwave antenna is determined based on at least one of the azimuth or the pitch angle. A first bias voltage value of the liquid crystal array is determined based on the target scanning angle. A voltage of the liquid crystal array is set to the first bias voltage value.

20 Claims, 3 Drawing Sheets

(56) References Cited

U.S. PATENT DOCUMENTS

| | | | |
|---|---|---|---|
| 2018/0076521 A1* | 3/2018 | Mehdipour | H01Q 15/0026 |
| 2018/0366825 A1* | 12/2018 | Klemes | H01Q 21/20 |
| 2020/0044326 A1* | 2/2020 | Olfert | H01Q 21/0012 |

FOREIGN PATENT DOCUMENTS

| | | |
|---|---|---|
| CN | 106450765 A | 2/2017 |
| CN | 107123860 A | 9/2017 |
| CN | 107785663 A | 3/2018 |
| CN | 108598631 A | 9/2018 |
| CN | 108767485 A | 11/2018 |
| CN | 109687140 A | 4/2019 |
| CN | 109786971 A | 5/2019 |
| CN | 110739527 A | 1/2020 |
| CN | 210516995 U | 5/2020 |
| EP | 3107153 A1 | 12/2016 |

OTHER PUBLICATIONS

Office Action issued in Chinese Application No. 201911129358.3 on Nov. 1, 2021, 16 pages (with English translation).

PCT International Search Report and Written Opinion issued in International Application No. PCT/CN2020/125747 on Feb. 3, 2021, 22 pages (with English translation).

\* cited by examiner

BEAM DIRECTION ADJUSTMENT METHOD, APPARATUS, AND ANTENNA SYSTEM

CROSS-REFERENCE TO RELATED APPLICATIONS

This application is a continuation of International Patent Application No. PCT/CN2020/125747, filed on Nov. 2, 2020, which claims priority to Chinese Patent Application No. 201911129358.3, filed on Nov. 18, 2019. The disclosures of the aforementioned applications are hereby incorporated by reference in their entireties.

TECHNICAL FIELD

This application relates to the field of communication technologies, and specifically, to a beam direction adjustment method, an apparatus, and an antenna system.

BACKGROUND

Microwave communication is mainly used in wireless backhaul scenarios. In a current microwave antenna installation process, manual tower climbing is still required for alignment, and fine antenna alignment takes long time. Especially for a high-gain narrow-beam antenna whose frequency is in a microwave frequency band of 80 GHz (71 to 76 GHz and 81 to 86 GHz), alignment is more difficult, and the antenna also needs to resist shaking of a tower. On a deployed or newly deployed microwave antenna, a beam sweeping function needs to be designed to implement automatic alignment and anti-shake functions at a specific angle.

Currently, there are two manners of implementing beam sweeping. In a first manner, beam sweeping is implemented in a mechanical rotation manner, to be specific, a motor drives a pan-tilt-zoom to rotate, and the pan-tilt-zoom rotates together with the entire antenna apparatus or some apparatuses of the antenna, to implement beam sweeping of the antenna. However, this manner has problems such as unreliable service life of the motor and a heat dissipation problem of the motor. In another manner, beam sweeping is implemented in an electronic scanning manner such as a phased array antenna. To be specific, an antenna array with a plurality of radio frequency channels is used, and beam direction of the antenna is changed by controlling a phase, so that automatic beam sweeping can be achieved. However, costs of the second manner are high, and this is not conducive to large-scale commercial use.

SUMMARY

Embodiments of this application provide a beam direction adjustment method, to implement automatic beam tracking and alignment of a microwave antenna.

To achieve the foregoing objective, the following technical solutions are provided in embodiments of this application.

A first aspect of this application provides a beam direction adjustment method, where the method is applied to an antenna system, the antenna system includes a microwave antenna and a radome installed at an air interface of the microwave antenna, the radome includes a liquid crystal array including M×N liquid crystal cells, and both M and N are integers greater than 0. When a liquid crystal bias voltage of the liquid crystal array is not changed, each liquid crystal cell in the liquid crystal array has a same refractive index. When the liquid crystal bias voltage of the liquid crystal array is changed, the refractive index of each liquid crystal cell in the liquid crystal array may change based on the change of the liquid crystal bias. The method includes: obtaining an azimuth and/or a pitch angle of the microwave antenna; determining a target scanning angle of the microwave antenna based on the azimuth and/or the pitch angle of the microwave antenna; determining a first bias voltage value of the liquid crystal array based on the target scanning angle, where a one-to-one correspondence exists between a beam sweeping angle of the microwave antenna, a phase layout, and a bias voltage value of the liquid crystal array; and setting a voltage of the liquid crystal array to the first bias voltage value.

It can be learned from the first aspect that, when it is detected that the microwave antenna deviates to an angle, a transmission phase of a liquid crystal cell may be changed by adjusting the liquid crystal bias voltage of the liquid crystal array in the radome, to implement a corresponding phase layout, so that a beam of the microwave antenna scans the angle. In this way, automatic tracking and alignment are implemented.

With reference to the first aspect, in a first possible implementation of the first aspect, the determining a first bias voltage value of the liquid crystal array based on the target scanning angle includes: determining a first phase layout of the liquid crystal array based on the target scanning angle; and determining the first bias voltage value of the liquid crystal array based on the first phase layout of the liquid crystal array.

With reference to the first aspect or the first possible implementation of the first aspect, in a second possible implementation of the first aspect, the determining a target scanning angle of the microwave antenna based on the azimuth and/or the pitch angle of the microwave antenna includes: determining a plurality of beam sweeping angles based on the azimuth and/or the pitch angle of the microwave antenna; determining a second bias voltage value of the liquid crystal array corresponding to each beam sweeping angle of the plurality of beam sweeping angles, and obtaining a received signal level value corresponding to each beam sweeping angle; and determining, from the plurality of beam sweeping angles based on the received signal level value corresponding to each beam sweeping angle, the target scanning angle whose received signal level value has largest strength.

With reference to the first aspect or the second possible implementation of the first aspect, in a third possible implementation of the first aspect, the determining a second bias voltage value of the liquid crystal array corresponding to each beam sweeping angle of the plurality of beam sweeping angles includes: determining a second phase layout of the liquid crystal array corresponding to each beam sweeping angle; and determining, based on the second phase layout, the second bias voltage value of the liquid crystal array corresponding to each beam sweeping angle.

With reference to the first aspect or the second or the third possible implementation of the first aspect, in a fourth possible implementation of the first aspect, differences between the plurality of beam sweeping angles and the azimuth and/or the pitch angle of the microwave antenna are less than or equal to 15 degrees.

With reference to the first aspect or the first possible implementation of the first aspect, in a fifth possible implementation of the first aspect, the target scanning angle is equal to the azimuth and/or the pitch angle.

A second aspect of this application provides a beam direction adjustment apparatus, where the apparatus is applied to an antenna system, and the antenna system includes a microwave antenna and a radome installed at an air interface of the microwave antenna. The radome includes a liquid crystal array including M×N liquid crystal cells, where both M and N are integers greater than 0. The apparatus includes: an obtaining module, configured to obtain an azimuth and/or a pitch angle of the microwave antenna; a determining module, configured to determine a target scanning angle of the microwave antenna based on the azimuth and/or the pitch angle of the microwave antenna obtained by the obtaining module, where the determining module is further configured to determine a first bias voltage value of the liquid crystal array based on the target scanning angle; and a setting module, configured to set a voltage of the liquid crystal array to the first bias voltage value determined by the determining module.

With reference to the second aspect, in a first possible implementation of the second aspect, the determining module is configured to: determine a first phase layout of the liquid crystal array based on the target scanning angle; and determine the first bias voltage value of the liquid crystal array based on the first phase layout of the liquid crystal array.

With reference to the second aspect or the first possible implementation of the second aspect, in a second possible implementation of the second aspect, the determining module is configured to: determine a plurality of beam scanning angles based on the azimuth and/or the pitch angle of the microwave antenna; and determine a second bias voltage value of the liquid crystal array corresponding to each beam scanning angle of the plurality of beam scanning angles, and obtain a received signal level value corresponding to each beam scanning angle; and determine, from the plurality of beam scanning angles based on the received signal level value corresponding to each beam scanning angle, the target scanning angle whose received signal level value has largest strength.

With reference to the second aspect or the second possible implementation of the second aspect, in a third possible implementation of the second aspect, the determining module is configured to: determine a second phase layout of the liquid crystal array corresponding to each beam sweeping angle; and determine, based on the second phase layout, the second bias voltage value of the liquid crystal array corresponding to each beam sweeping angle.

With reference to the second aspect or the second or the third possible implementation of the second aspect, in a fourth possible implementation of the second aspect, differences between the plurality of beam sweeping angles and the azimuth and/or the pitch angle are less than or equal to 15 degrees.

With reference to the second aspect or the first possible implementation of the second aspect, in a fifth possible implementation of the second aspect, the target scanning angle is equal to the azimuth and/or the pitch angle.

A third aspect of this application provides an antenna system, where the antenna system includes a microwave antenna and a radome installed at an air interface of the microwave antenna, the radome includes a liquid crystal array including M×N liquid crystal cells, both M and N are integers greater than 0, and the liquid crystal array is configured to adjust a beam sweeping angle of the microwave antenna.

A fourth aspect of this application provides a computer-readable storage medium that stores instructions, and when the instructions are run on a computer, the computer is enabled to perform the methods according to the foregoing aspects.

A fifth aspect of this application provides a computer program product that includes instructions, and when the computer program product runs on a computer, the computer is enabled to perform the methods according to the foregoing aspects.

In embodiments of this application, the radome with the liquid crystal array is installed on the microwave antenna. When it is detected that the microwave antenna deviates to an angle, the transmission phase of the liquid crystal cell may be changed by adjusting the liquid crystal bias voltage of the liquid crystal array in the radome, to implement the corresponding phase layout, so that the beam of the microwave antenna scans the angle. In this way, automatic tracking and alignment are implemented.

DESCRIPTION OF EMBODIMENTS

The following describes in detail technical solutions in embodiments of this application with reference to the accompanying drawings in embodiments of this application.

An embodiment of this application provides a beam direction adjustment method. The method is applied to an antenna system. The antenna system includes a microwave antenna and a radome installed at an air interface of the microwave antenna. The radome includes a liquid crystal array including M×N liquid crystal cells. When it is detected that the microwave antenna deviates to an angle, a transmission phase of a liquid crystal cell may be changed by adjusting a liquid crystal bias voltage of the liquid crystal array in the radome, so that a beam of the microwave antenna scans the angle. In this way, automatic tracking and alignment are implemented. Embodiments of this application further provide a corresponding beam direction adjustment apparatus. Details are separately described in the following.

In the specification, claims, and accompanying drawings of this application, the terms "first", "second", and the like are intended to distinguish between similar objects but do not necessarily indicate a specific order or sequence. It should be understood that data used in such a way are interchangeable in proper cases, so that the embodiments described herein can be implemented in other orders than the order illustrated or described herein. In addition, the terms "include" and "have" and any variations thereof are intended to cover non-exclusive inclusions, for example, a process, method, system, product, or device including a series of steps or modules need not be limited to those clearly listed steps or modules, but may include other steps or modules that are not clearly listed or are inherent to these processes, methods, products, or devices. Naming or numbering of steps in this application does not mean that the steps in the method procedures need to be performed in a time/logical order indicated by the naming or numbering. An execution order of the steps in the procedures that have been named or numbered can be changed based on a technical objective to be achieved, as long as same or similar technical effects can be achieved. Module division in this application is logical division. There may be another division manner during actual application. For example, a plurality of modules may be combined or integrated into another system, or some features may be ignored or not performed. In addition, the displayed or discussed mutual couplings or direct couplings or communication connections may be implemented by using some interfaces. Indirect couplings or communication connections between the modules may be implemented in an electronic or another similar form. This is not limited in this application. In addition, the modules or submodules described as separate parts may or may not be physically separate, may or may not be physical modules, or may be distributed on a plurality of circuit modules. Some or all of the modules may be selected based on an actual requirement to implement the objectives of the solutions of this application.

Figure 1:
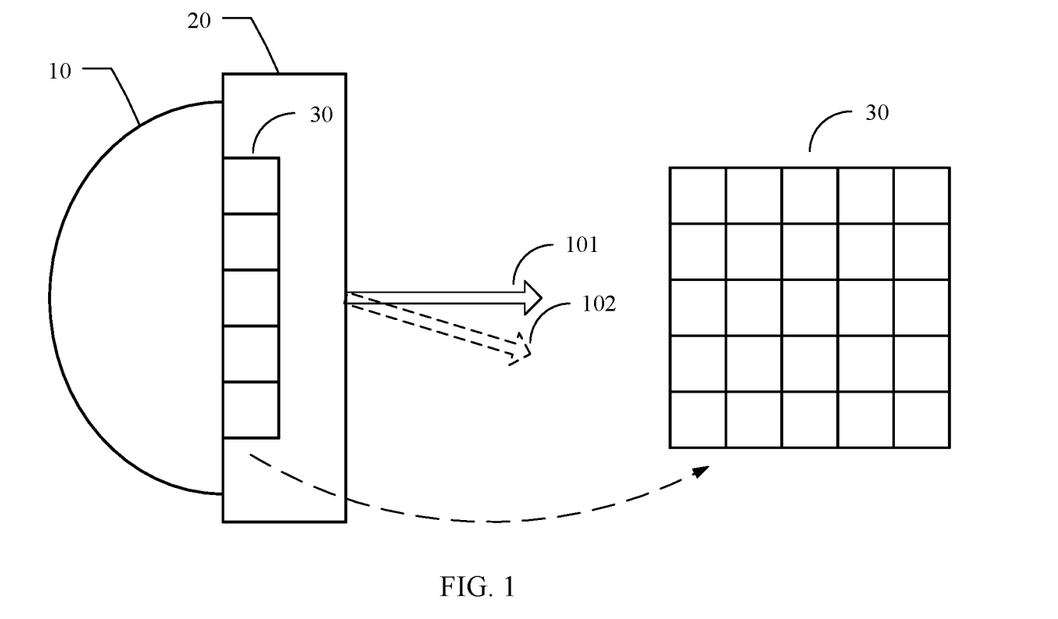
FIG. 1 is a schematic diagram of a structure of an antenna system according to an embodiment of this application.

An antenna system provided in an embodiment of this application is first described. Refer to FIG. 1.

FIG. 1 is a schematic diagram of a structure of an antenna system according to an embodiment of this application. As shown in FIG. 1, the antenna system provided in this embodiment of this application includes a microwave antenna 10 and a radome 20 with a liquid crystal array 30.

The microwave antenna 10 provided in this embodiment of this application may be a parabolic antenna shown in FIG. 1, or may be an aperture antenna such as a lens antenna. This is not limited in this embodiment of this application. The microwave antenna 10 may be an E-band high-gain narrow-beam antenna whose frequency is 80 GHz in a microwave frequency band (71-76 GHz and 81-86 GHz). The radome 20 provided in this embodiment of this application is installed at an air interface of the microwave antenna 10. The radome 20 includes a liquid crystal array including M×N liquid crystal cells, where both M and N are integers greater than 0. For example, when both M and N are equal to 5, that is, the liquid crystal array 30 is a 5×5 array, including 25 liquid crystal cells, as shown in FIG. 1. It may be understood that the liquid crystal array 30 shown in FIG. 1 is merely an example in this embodiment of this application, and the liquid crystal array 30 may further include any quantity of liquid crystal cells. This is not limited in this embodiment of this application.

In this embodiment of this application, the M×N liquid crystal cells included in the liquid crystal array 30 have a same thickness d. The liquid crystal array 30 has two states: an off state and an on state. When the liquid crystal array 30 is in the off state, that is, a liquid crystal bias voltage of the liquid crystal array 30 is not changed, all the liquid crystal cells in the liquid crystal array 30 have a same refractive index no. In this case, when a beam transmitted by the microwave antenna 10 passes through the liquid crystal array, for example, after the beam passes through five liquid crystal cells numbered 1, 2, 3, 4, and 5, a phase corresponding to each liquid crystal cell is increased by $\Delta\varphi_0 = n_0 d$ after the beam passes through each liquid crystal cell, a phase difference between two adjacent liquid crystal cells remains unchanged, and a beam direction also remains unchanged, for example, a first beam direction 101 of the beam in FIG. 1. When the liquid crystal array 30 is in the on state, that is, the liquid crystal bias voltage of the liquid crystal array 30 is changed, a refractive index of each liquid crystal cell in the liquid crystal array 30 may be changed based on the bias change. For example, refractive indexes of liquid crystal cells 1, 2, 3, 4, and 5 are changed to n1, n2, n3, n4, and n5 by changing the liquid crystal bias. After a beam transmitted by the microwave antenna 10 needs to pass through the liquid crystal cells 1, 2, 3, 4, and 5, phases corresponding to the liquid crystal cells increase by $n_1 d$, $n_2 d$, $n_3 d$, $n_4 d$, $n_5 d$ respectively. A phase difference between the two adjacent liquid crystal cells is changed, and a phase layout of the beam that passes through the five liquid crystal cells is changed. When the phase difference between the two adjacent liquid crystal cells is equal to $\Delta n d$, where $\Delta n$ is a refractive index change value, and a phase layout change causes a beam direction to change, for example, a second beam direction 102 of the beam in FIG. 1.

Based on the foregoing antenna system, an embodiment of this application subsequently provides a beam direction adjustment method. The method may be applied to an automatic alignment scenario of a microwave antenna, or may be applied to an anti-shake scenario of the microwave antenna. The automatic alignment scenario mainly occurs when antennas are installed for the first time. After the antennas at both ends are roughly installed, beams need to be adjusted until complete alignment is achieved. Usually, the beams need to be adjusted within ±15°. In the anti-shake scenario, the antennas are slightly deviated due to deviation of a tower or pole caused by wind and sunlight. Usually, the microwave antennas need to have a scanning function within ±1°.

Figure 2:
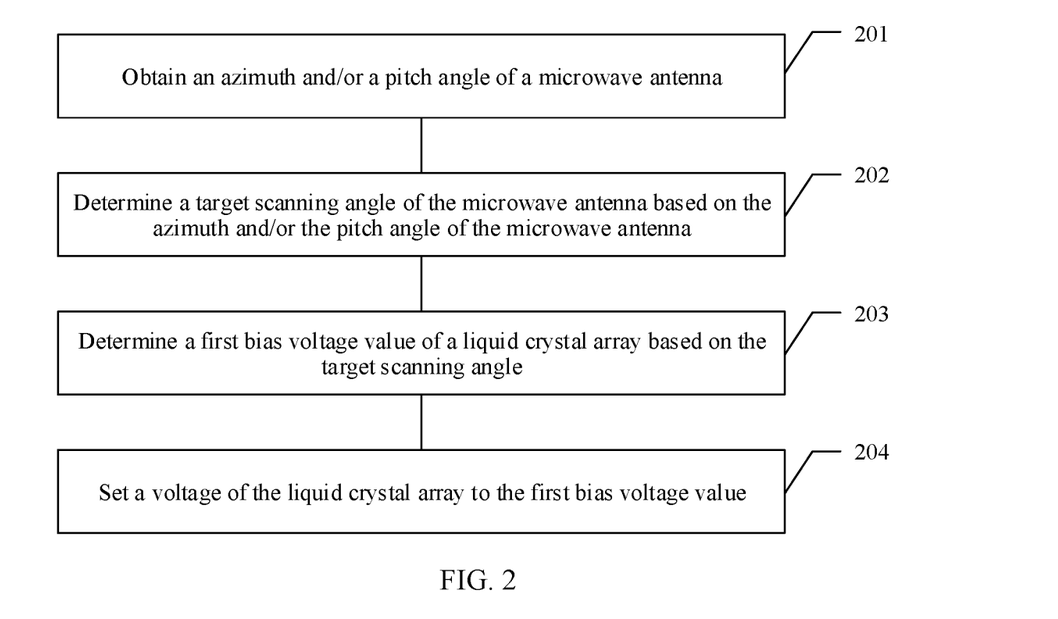
FIG. 2 is a schematic diagram of an embodiment of a beam direction adjustment method according to an embodiment of this application.

FIG. 2 is a schematic diagram of an embodiment of a beam direction adjustment method according to an embodiment of this application.

Refer to FIG. 2. An embodiment of a beam direction adjustment method provided in an embodiment of this application may include the following steps.

201: A network device obtains an azimuth and/or a pitch angle of a microwave antenna.

In this embodiment of this application, the pitch angle of the microwave antenna may be an angle between a beam transmitted by the microwave antenna and a horizontal plane. The azimuth of the microwave antenna may be an angle between the beam transmitted by the microwave antenna and a vertical plane. The vertical plane is a plane perpendicular to the horizontal plane on which a connection line between the microwave antenna and a peer antenna is located.

In this embodiment of this application, the network device first obtains a current pitch angle and/or azimuth of the microwave antenna. Specifically, the network device may obtain the pitch angle or the azimuth of the microwave antenna by using a gyroscope, a GPS, or the like.

202: The network device determines a target scanning angle of the microwave antenna based on the azimuth and/or the pitch angle of the microwave antenna.

In this embodiment of this application, after detecting the azimuth and/or the pitch angle of the microwave antenna, the network device determines the target scanning angle of the microwave antenna based on the azimuth and/or the pitch angle.

203: The network device determines a first bias voltage value of a liquid crystal array based on the target scanning angle.

In this embodiment of this application, after determining the target scanning angle of the microwave antenna based on the azimuth and/or the pitch angle of the microwave antenna, the network device determines the first bias voltage value of the liquid crystal array based on the target scanning angle.

Specifically, in this embodiment of this application, there is a one-to-one correspondence between a beam sweeping angle of the microwave antenna, a phase layout, and a bias value of the liquid crystal array. The network device first determines, based on the target scanning angle, a phase layout corresponding to the target scanning angle. Because a change amount of a phase is corresponding to a change amount of a dielectric constant of a liquid crystal cell, the first bias voltage value corresponding to the dielectric constant of the current liquid crystal array may be determined based on the phase layout and a material property of the current liquid crystal array.

204: The network device sets a voltage of the liquid crystal array to the first bias voltage value.

In this embodiment of this application, after determining the first bias voltage value of the liquid crystal array corresponding to the target scanning angle, the network device sets the voltage of the liquid crystal array to the first bias voltage value, so that the beam sweeping angle of the microwave antenna is aligned with the target scanning angle.

In this embodiment of this application, when it is detected that the microwave antenna deviates to an angle, a transmission phase of a liquid crystal cell may be changed by adjusting a liquid crystal bias voltage of a liquid crystal array in a radome, to implement a corresponding phase layout, so that a beam of the microwave antenna scans the angle. In this way, automatic tracking and alignment are implemented.

Optionally, when the foregoing embodiment is applied to an anti-shake scenario, beam sweeping generally needs to be implemented within ±1° to resist shaking of the microwave antenna and ensure that communication is not interrupted. In this case, in step 202 in the foregoing embodiment, the target scanning angle is the detected azimuth or pitch angle of the microwave antenna. The network device may accurately control, based on the one-to-one correspondence between a scanning angle, a phase layout, and a bias value of the liquid crystal array and according to an anti-shake tracking algorithm, a bias layout of liquid crystal arrays corresponding to different pitch angles and/or azimuths, to quickly track and resist shaking, and maintain normal microwave link communication.

Optionally, when the foregoing embodiment is applied to an automatic alignment scenario of the microwave antenna, the foregoing method may mainly occur when antennas are installed for the first time. After the antennas at two ends are roughly installed, beams usually need to be adjusted within ±15°. In this case, in step 202 in the foregoing embodiment, the target scanning angle is different from that in the anti-shake scenario. This is described in detail in the embodiment in FIG. 3.

Figure 3:
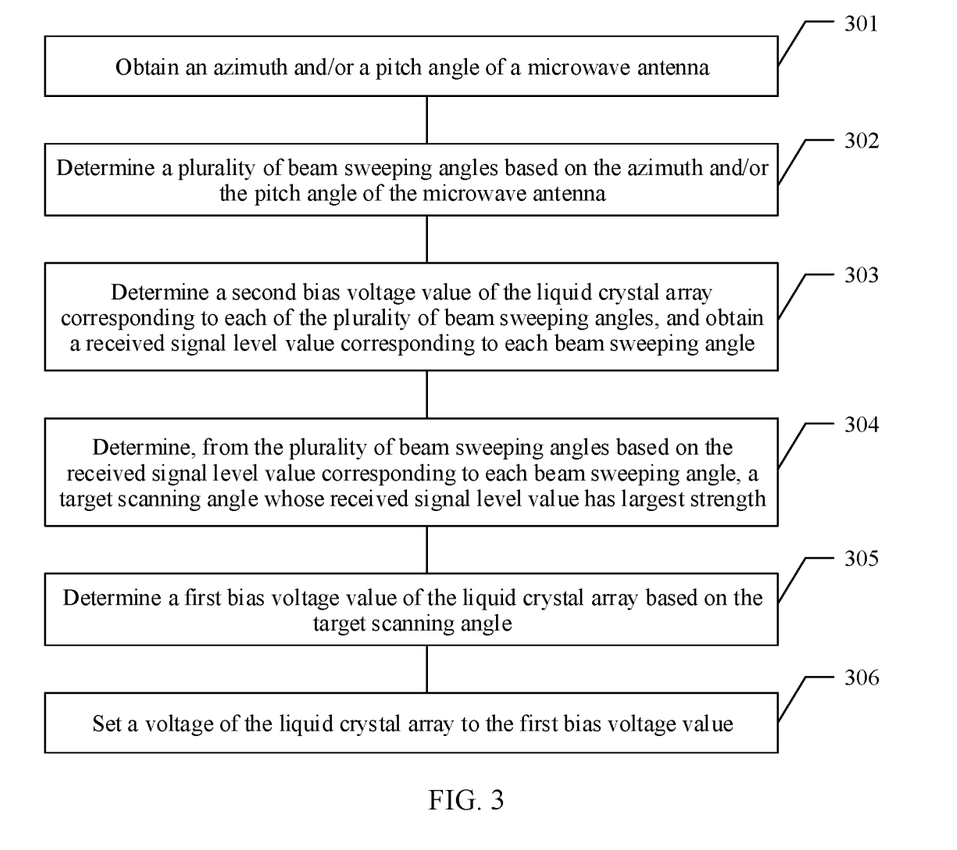
FIG. 3 is a schematic diagram of another embodiment of a beam direction adjustment method according to an embodiment of this application.

FIG. 3 is a schematic diagram of another embodiment of a beam direction adjustment method according to an embodiment of this application.

Refer to FIG. 3. Another embodiment of a beam direction adjustment method provided in this embodiment of this application may include the following steps.

301: Obtain an azimuth and/or a pitch angle of a microwave antenna.

For understanding of this embodiment of this application, refer to step 201 in FIG. 2. Details are not described herein again.

302: Determine a plurality of beam sweeping angles based on the azimuth and/or the pitch angle of the microwave antenna.

In this embodiment of this application, after detecting the current azimuth and/or pitch angle of the microwave antenna, the network device determines the plurality of beam scanning angles based on the azimuth and/or the pitch angle. In this embodiment of this application, the plurality of different beam sweeping angles may include the azimuth and/or the pitch angle. Optionally, in this embodiment of this application, differences between the beam sweeping angles and the azimuth and/or the pitch angle are less than or equal to 15 degrees.

The azimuth is used as an example. When detecting that the current azimuth of the microwave antenna is θ, the network device determines the plurality of different beam sweeping angles based on the azimuth θ. Differences between the plurality of different beam sweeping angles and θ are less than or equal to 15 degrees.

303: Determine a second bias voltage value of a liquid crystal array corresponding to each beam sweeping angle of the plurality of beam sweeping angles, and obtain a received signal level value corresponding to each beam scanning angle.

In this embodiment of this application, after determining the plurality of beam sweeping angles, the network device accurately controls the second bias voltage value of the liquid crystal array corresponding to each beam sweeping angle.

In this embodiment of this application, the network device may accurately control, by using an alignment tracking algorithm, bias voltage values of bias voltage layouts of the liquid crystal array corresponding to different beam sweeping angles. In this embodiment of this application, there is a one-to-one correspondence between a scanning angle, a phase layout, and a voltage value that is of a liquid crystal cell. The network device accurately controls the bias voltage layout of the liquid crystal arrays based on the one-to-one correspondence by using the alignment tracking algorithm. Specifically, when controlling a bias voltage layout of a liquid crystal array corresponding to a beam sweeping angle, the network device first determines a phase layout of the liquid crystal array based on the beam sweeping angle. A change amount of a phase is corresponding to a change amount of a dielectric constant of a liquid crystal cell. A bias voltage value corresponding to a dielectric constant of a current liquid crystal model is found based on a material property of the liquid crystal cell, and then a voltage is set to the bias voltage value.

In this embodiment of this application, after the second bias voltage value of the liquid crystal array corresponding to each beam sweeping angle is set, the received signal level value corresponding to each beam sweeping angle is obtained.

304: Determine, from the plurality of beam sweeping angles based on the received signal level value corresponding to each beam sweeping angle, the target scanning angle whose received signal level value has largest strength.

In this embodiment of this application, after obtaining the received signal level value corresponding to each beam sweeping angle, the network device compares the received signal level value corresponding to each beam sweeping angle, to determine, from the plurality of beam sweeping angles, the target scanning angle whose received signal level value has largest strength.

305: Determine a first bias voltage value of the liquid crystal array based on the target scanning angle.

For understanding of this embodiment of this application, refer to step 203 in FIG. 2. Details are not described herein again.

306: Set the voltage of the liquid crystal array to the first bias voltage value.

For understanding of this embodiment of this application, refer to step 204 in FIG. 2. Details are not described herein again.

In this embodiment of this application, when it is detected that the microwave antenna deviates to an angle, a transmission phase of a liquid crystal cell may be changed by adjusting a liquid crystal bias voltage of a liquid crystal array in a radome, to implement a corresponding phase layout, so that a beam of the microwave antenna scans the angle. In this way, automatic tracking and alignment are implemented.

Figure 4:
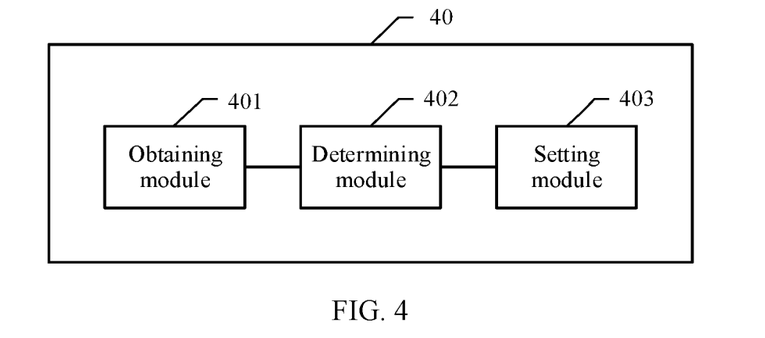
FIG. 4 is a schematic diagram of a structure of a beam direction adjustment apparatus according to an embodiment of this application.

The foregoing describes the beam direction adjustment method provided in embodiments of this application. The following describes a beam direction adjustment apparatus provided in embodiments of this application. The beam direction adjustment apparatus provided in embodiments of this application is applied to the antenna system shown in FIG. 1. Refer to FIG. 4.

FIG. 4 is a schematic diagram of a structure of a beam direction adjustment apparatus according to an embodiment of this application.

Refer to FIG. 4. The beam direction adjustment apparatus provided in this embodiment of this application may include:

an obtaining module 401, configured to obtain an azimuth and/or a pitch angle of a microwave antenna;

a determining module 402, configured to determine a target scanning angle of the microwave antenna based on the azimuth and/or the pitch angle of the microwave antenna obtained by the obtaining module 401, where the determining module 402 is further configured to determine a first bias voltage value of a liquid crystal array based on the target scanning angle; and a setting module 403, configured to set a voltage of the liquid crystal array to the first bias voltage value determined by the determining module 402.

The beam direction adjustment apparatus provided in this embodiment of this application can change, when it is detected that the microwave antenna deviates to an angle, a transmission phase of a liquid crystal unit by adjusting a liquid crystal bias voltage of a liquid crystal array in a radome, to implement a corresponding phase layout, so that a beam of the microwave antenna scans the angle. In this way, automatic tracking and alignment are implemented.

Optionally, in an embodiment, the determining module 402, is configured to: determine a first phase layout of the liquid crystal array based on the target scanning angle; and determine the first bias voltage value of the liquid crystal array based on the first phase layout of the liquid crystal array.

Optionally, in an embodiment, the determining module 402 is configured to: determine a plurality of beam sweeping angles based on the azimuth and/or the pitch angle of the microwave antenna; determine a second bias voltage value of the liquid crystal array corresponding to each beam sweeping angle of the plurality of beam sweeping angles, and obtain a received signal level value corresponding to each beam sweeping angle; and determine, from the plurality of beam sweeping angles based on the received signal level value corresponding to each beam sweeping angle, the target scanning angle whose received signal level value has largest strength.

Optionally, in an embodiment, the determining module 402 is configured to: determine a second phase layout that is of the liquid crystal array and that corresponds to each beam sweeping angle; and determine, based on the second phase layout, the second bias value that is of the liquid crystal array and that corresponds to each beam sweeping angle.

Optionally, in an embodiment, differences between the plurality of beam sweeping angles and the azimuth and/or the pitch angle are less than or equal to 15 degrees.

Optionally, in an embodiment, the target scanning angle is equal to the azimuth and/or the pitch angle.

Figure 5:
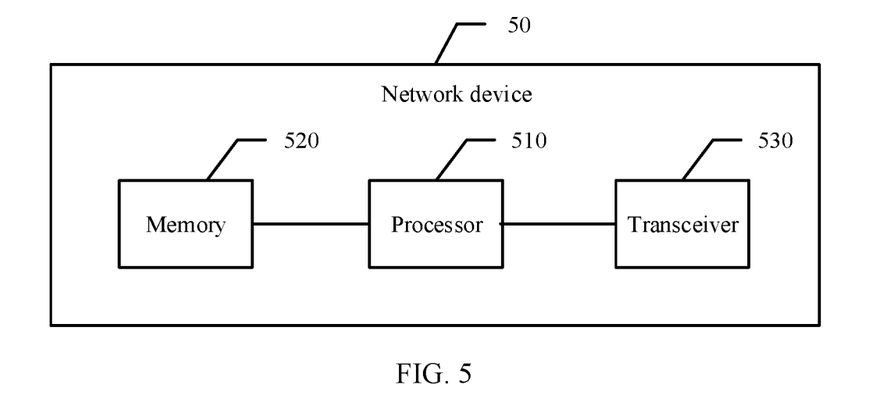
FIG. 5 is a schematic diagram of a structure of a network device according to an embodiment of this application.

As shown in FIG. 5, an embodiment of this application further provides a network device 50. The network device 50 includes a processor 510, a memory 520, and a transceiver 530. The memory 520 stores instructions or a program, and the processor 510 is configured to execute the instructions or the program stored in the memory 520. When the instructions or the program stored in the memory 520 is executed, the processor 510 is configured to perform operations performed by the obtaining module 401, the determining module 402, and the setting module 403 in the foregoing embodiment.

It should be understood that the network device 50 in this embodiment of this application is a device corresponding to the network device in the beam direction adjustment method in embodiments of this application, and operations and/or functions of modules in the network device 50 are for implementing corresponding procedures of the methods in FIG. 2 to FIG. 3. For brevity, details are not described herein again.

An embodiment of this application further provides a computer-readable storage medium. The computer-readable storage medium stores a computer program. When the program is executed by a processor, the method in any one of the foregoing embodiments can be implemented.

An embodiment of this application further provides a computer program product. When the computer program product is executed by a computer, the method in any one of the foregoing embodiments is implemented.

It should be understood that the processor in embodiments of this application may be a central processing unit (CPU), may be another general-purpose processor, a digital signal processor (DSP), an application-specific integrated circuit (ASIC), a field programmable gate array (FPGA), or another programmable logic device, a transistor logic device, a hardware component, or any combination thereof. The general-purpose processor may be a microprocessor or any conventional processor.

The method steps in embodiments of this application may be implemented in a hardware manner, or may be implemented in a manner of executing software instructions by the processor. The software instructions may include a corresponding software module. The software module may be stored in a random access memory (RAM), a flash memory, a read-only memory (ROM), a programmable read-only memory (Programmable ROM, PROM), an erasable programmable read-only memory (Erasable PROM, EPROM), an electrically erasable programmable read-only memory (Electrically EPROM, EEPROM), a register, a hard disk drive, a removable hard disk drive, a compact disc read-only memory (CD-ROM), or any other form of storage medium well-known in the art. For example, a storage medium is coupled to a processor, so that the processor can read information from the storage medium or write information into the storage medium. Certainly, the storage medium may further be a component of the processor. The processor and the storage medium may be located in an ASIC. In addition, the ASIC may be located in a network device or a terminal device. Certainly, the processor and the storage medium may exist in the network device or the terminal device as discrete components.

All or some of the foregoing embodiments may be implemented through software, hardware, firmware, or any combination thereof. When software is used to implement the embodiments, all or some of the embodiments may be implemented in a form of a computer program product. The computer program product includes one or more computer programs or instructions. When the computer programs or the instructions are loaded and executed on a computer, all or some of the procedures or functions in embodiments of this application are performed. The computer may be a general-purpose computer, a special-purpose computer, a computer network, or other programmable apparatuses. The computer programs or the instructions may be stored in the computer-readable storage medium, or may be transmitted through the computer-readable storage medium. The computer-readable storage medium may be any usable medium accessible by a computer, or a data storage device such as a server integrating one or more usable media. The usable medium may be a magnetic medium, for example, a floppy disk, a hard disk drive, or a magnetic tape; or may be an optical medium, for example, a DVD; or may be a semiconductor medium, for example, a solid-state drive (SSD).

In embodiments of this application, unless otherwise stated or there is a logic conflict, terms and/or descriptions between different embodiments are consistent and may be mutually referenced, and technical features in the different embodiments may be combined based on an internal logical relationship thereof, to form a new embodiment.

In this application, "at least one" means one or more, and "a plurality of" means two or more. The term "and/or" describes an association relationship between associated objects and indicates that three relationships may exist. For example, A and/or B may indicate the following cases: Only A exists, both A and B exist, and only B exists, where A and B may be singular or plural.

The foregoing describes in detail a beam direction adjustment method, an apparatus, and a storage medium provided in embodiments of this application. In this specification, specific examples are used to describe the principle and implementations of the present disclosure, and the descriptions of the embodiments are only intended to help understand the method and core idea of the present disclosure. In addition, a person of ordinary skill in the art may make modifications to the specific implementations and the application scope based on the idea of the present disclosure. Therefore, the content of this specification shall not be construed as a limitation to the present disclosure.

What is claimed is:

1. A beam direction adjustment method, comprising:
    obtaining at least one of an azimuth or a pitch angle of a microwave antenna in an antenna system, wherein the antenna system comprises the microwave antenna and a radome installed at an air interface of the microwave antenna, the radome comprises a liquid crystal array including M×N liquid crystal cells, and both M and N are integers greater than 0;
    determining a target scanning angle of the microwave antenna based on at least one of the azimuth or the pitch angle of the microwave antenna, wherein determining the target scanning angle comprises:
        determining a plurality of beam sweeping angles based on at least one of the azimuth or the pitch angle of the microwave antenna;
        determining a first bias voltage value of the liquid crystal array corresponding to each beam sweeping angle of the plurality of beam sweeping angles;
        obtaining a received signal level value corresponding to each beam sweeping angle; and
        determining, from the plurality of beam sweeping angles based on the received signal level value corresponding to each beam sweeping angle, the target scanning angle whose received signal level value has largest strength;
    determining a second bias voltage value of the liquid crystal array based on the target scanning angle; and
    setting a voltage of the liquid crystal array to the second bias voltage value.

2. The method according to claim 1, wherein the determining a second bias voltage value of the liquid crystal array based on the target scanning angle comprises:
    determining a first phase layout of the liquid crystal array based on the target scanning angle; and
    determining the second bias voltage value of the liquid crystal array based on the first phase layout of the liquid crystal array.

3. The method according to claim 1, wherein the determining a first bias voltage value of the liquid crystal array corresponding to each beam sweeping angle of the plurality of beam sweeping angles comprises:
    determining a second phase layout that is of the liquid crystal array and that corresponds to each beam sweeping angle; and
    determining, based on the second phase layout, the first bias voltage value of the liquid crystal array corresponding to each beam sweeping angle.

4. The method according to claim 1, wherein differences between the plurality of beam sweeping angles and the azimuth of the microwave antenna and differences between the plurality of beam sweeping angles and the pitch angle of the microwave antenna are less than or equal to 15 degrees.

5. The method according to claim 1, wherein the target scanning angle is equal to at least one of the azimuth or the pitch angle.

6. A beam direction adjustment apparatus comprising a memory and at least one processor, wherein the memory stores executable instructions that when executed by the at least one processor, cause the apparatus to perform operations comprising:
    obtaining at least one of an azimuth or a pitch angle of a microwave antenna in an antenna system, wherein the antenna system comprises the microwave antenna and a radome installed at an air interface of the microwave antenna, the radome comprises a liquid crystal array including M×N liquid crystal cells, and both M and N are integers greater than 0;
    determining a target scanning angle of the microwave antenna based on at least one of the azimuth or the pitch angle of the microwave antenna, wherein determining the target scanning angle comprises:
        determining a plurality of beam sweeping angles based on at least one of the azimuth or the pitch angle of the microwave antenna;
        determining a first bias voltage value of the liquid crystal array corresponding to each beam sweeping angle of the plurality of beam sweeping angles;
        obtaining a received signal level value corresponding to each beam sweeping angle; and
        determining, from the plurality of beam sweeping angles based on the received signal level value corresponding to each beam sweeping angle, the target scanning angle whose received signal level value has largest strength;

determining a second bias voltage value of the liquid crystal array based on the target scanning angle; and setting a voltage of the liquid crystal array to the second bias voltage value.

7. The apparatus according to claim 6, wherein the determining a second bias voltage value of the liquid crystal array based on the target scanning angle comprises:

determining a first phase layout of the liquid crystal array based on the target scanning angle; and determining the second bias voltage value of the liquid crystal array based on the first phase layout of the liquid crystal array.

8. The apparatus according to claim 6, wherein the determining a first bias voltage value of the liquid crystal array corresponding to each beam sweeping angle of the plurality of beam sweeping angles comprises:

determining a second phase layout that is of the liquid crystal array and that corresponds to each beam sweeping angle; and determining, based on the second phase layout, the first bias voltage value that is of the liquid crystal array and that corresponds to each beam sweeping angle.

9. The apparatus according to claim 6, wherein differences between the plurality of beam sweeping angles and the azimuth of the microwave antenna and differences between the plurality of beam sweeping angles and the pitch angle of the microwave antenna are less than or equal to 15 degrees.

10. The apparatus according to claim 6, wherein the target scanning angle is equal to at least one of the azimuth or the pitch angle.

11. A non-transitory computer-readable storage medium, comprising computer program instructions executable by a computer system to perform operations comprising:

obtaining at least one of an azimuth or a pitch angle of a microwave antenna in an antenna system, wherein the antenna system comprises the microwave antenna and a radome installed at an air interface of the microwave antenna, the radome comprises a liquid crystal array including M×N liquid crystal cells, and both M and N are integers greater than 0;

determining a target scanning angle of the microwave antenna based on at least one of the azimuth or the pitch angle of the microwave antenna, wherein determining the target scanning angle comprises:

determining a plurality of beam sweeping angles based on at least one of the azimuth or the pitch angle of the microwave antenna;

determining a first bias voltage value of the liquid crystal array corresponding to each beam sweeping angle of the plurality of beam sweeping angles;

obtaining a received signal level value corresponding to each beam sweeping angle; and determining, from the plurality of beam sweeping angles based on the received signal level value corresponding to each beam sweeping angle, the target scanning angle whose received signal level value has largest strength;

determining a second bias voltage value of the liquid crystal array based on the target scanning angle; and setting a voltage of the liquid crystal array to the second bias voltage value.

12. The non-transitory computer-readable storage medium according to claim 1, wherein the determining a second bias voltage value of the liquid crystal array based on the target scanning angle comprises:

determining a first phase layout of the liquid crystal array based on the target scanning angle; and determining the second bias voltage value of the liquid crystal array based on the first phase layout of the liquid crystal array.

13. The non-transitory computer-readable storage medium according to claim 11, wherein the determining a first bias voltage value of the liquid crystal array corresponding to each beam sweeping angle of the plurality of beam sweeping angles comprises:

determining a second phase layout that is of the liquid crystal array and that corresponds to each beam sweeping angle; and determining, based on the second phase layout, the first bias voltage value that is of the liquid crystal array and that corresponds to each beam sweeping angle.

14. The non-transitory computer-readable storage medium according to claim 11, wherein differences between the plurality of beam sweeping angles and the azimuth of the microwave antenna and differences between the plurality of beam sweeping angles and the pitch angle of the microwave antenna are less than or equal to 15 degrees.

15. The non-transitory computer-readable storage medium according to claim 11, wherein the target scanning angle is equal to at least one of the azimuth or the pitch angle.

16. The method according to claim 1, wherein obtaining the received signal level value corresponding to each beam sweeping angle comprises:

after determining the first bias voltage value of the liquid crystal array corresponding to each beam sweeping angle of the plurality of beam sweeping angles, obtaining the received signal level value corresponding to each beam sweeping angle.

17. The method according to claim 1, wherein determining the second bias voltage value of the liquid crystal array based on the target scanning angle comprises:

determining, based on the target scanning angle and a dielectric constant of the liquid crystal array, the second bias voltage value of the liquid crystal array.

18. The apparatus according to claim 6, wherein obtaining the received signal level value corresponding to each beam sweeping angle comprises:

after determining the first bias voltage value of the liquid crystal array corresponding to each beam sweeping angle of the plurality of beam sweeping angles, obtaining the received signal level value corresponding to each beam sweeping angle.

19. The apparatus according to claim 6, wherein determining the second bias voltage value of the liquid crystal array based on the target scanning angle comprises:

determining, based on the target scanning angle and a dielectric constant of the liquid crystal array, the second bias voltage value of the liquid crystal array.

20. The non-transitory computer-readable storage medium according to claim 11, wherein obtaining the received signal level value corresponding to each beam sweeping angle comprises:

after determining the first bias voltage value of the liquid crystal array corresponding to each beam sweeping angle of the plurality of beam sweeping angles, obtaining the received signal level value corresponding to each beam sweeping angle.

* * * * *

UNITED STATES PATENT AND TRADEMARK OFFICE
CERTIFICATE OF CORRECTION

| | |
|---|---|
| PATENT NO. | : 12,046,833 B2 |
| APPLICATION NO. | : 17/746704 |
| DATED | : July 23, 2024 |
| INVENTOR(S) | : Ling Zeng et al. |

It is certified that error appears in the above-identified patent and that said Letters Patent is hereby corrected as shown below:

In the Claims

In Column 13, In Line 66 (Approx.), In Claim 12, delete "claim 1," and insert -- claim 11, --.

Signed and Sealed this
Fifth Day of November, 2024

Katherine Kelly Vidal
*Director of the United States Patent and Trademark Office*